June 10, 1958
P. E. ANDERSON
2,837,814
APPARATUS FOR ASSEMBLING INSULATING WASHERS ON RELAY CORES
Filed Sept. 30, 1955
2 Sheets-Sheet 1
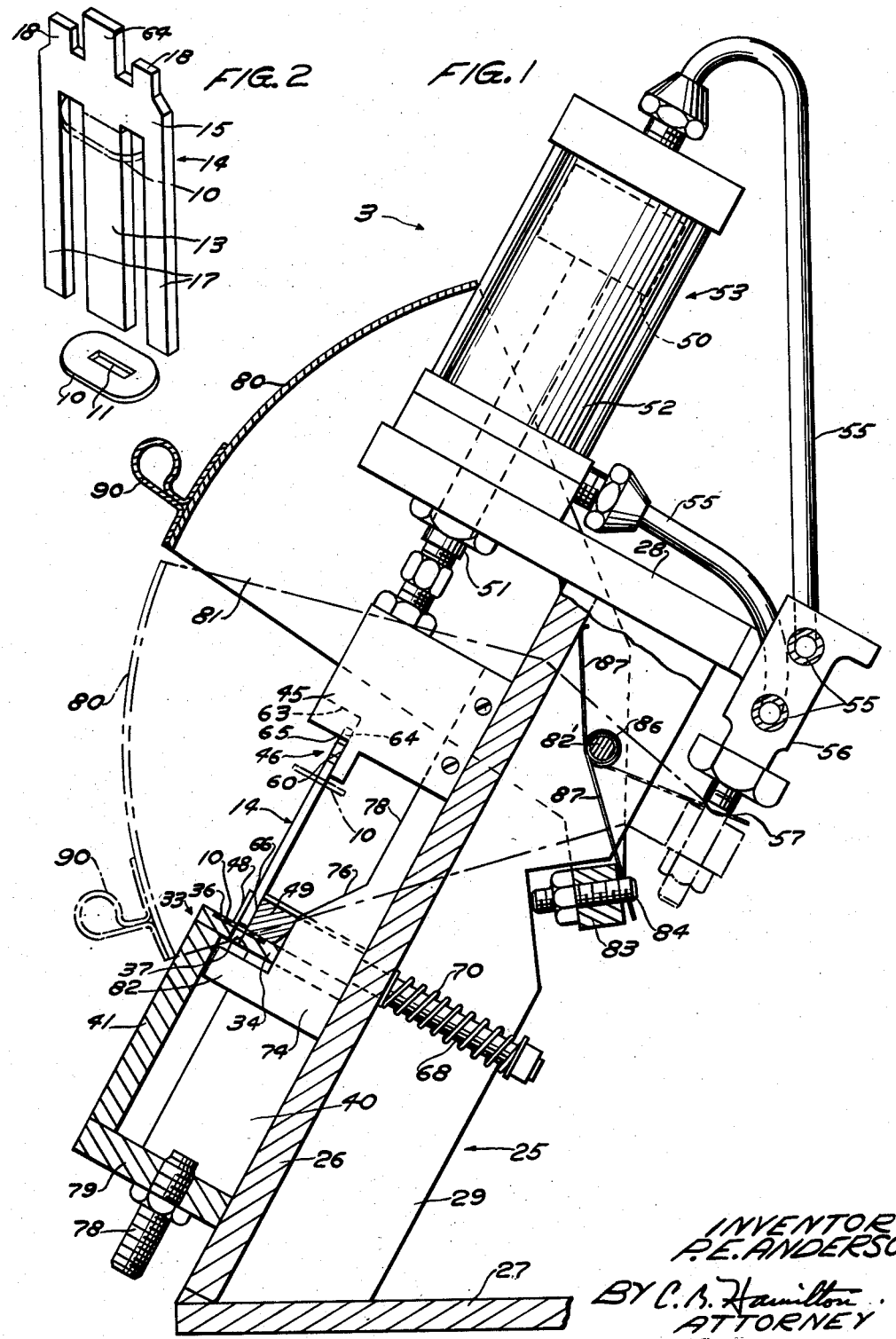
INVENTOR
P. E. ANDERSON
BY C. B. Hamilton
ATTORNEY June 10, 1958 P. E. ANDERSON 2,837,814
APPARATUS FOR ASSEMBLING INSULATING WASHERS ON RELAY CORES
Filed Sept. 30, 1955 2 Sheets-Sheet 2
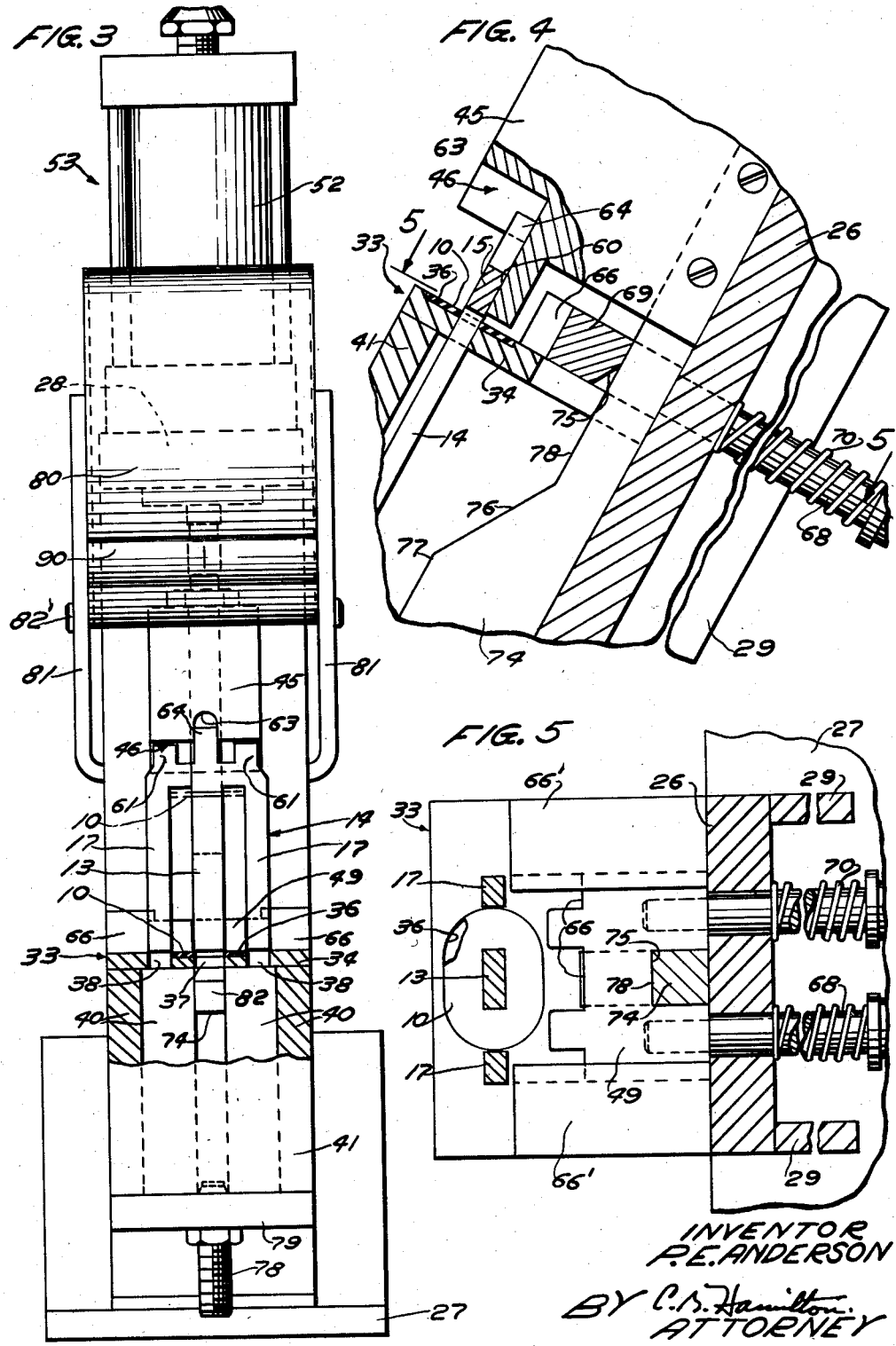
INVENTOR
P. E. ANDERSON
BY C. B. Hamilton
ATTORNEY United States Patent Office 2,837,814
Patented June 10, 1958

2,837,814

APPARATUS FOR ASSEMBLING INSULATING WASHERS ON RELAY CORES

Paul E. Anderson, Hinsdale, Ill., assignor to Western Electric Company, Incorporated, New York, N. Y., a corporation of New York Application September 30, 1955, Serial No. 537,695

6 Claims. (Cl. 29—252)

This invention relates to an apparatus for assembling parts and more particularly to a machine for forcing insulating washers onto relay cores.

An object of the invention is to provide a new and improved apparatus for assembling insulating washers onto relay cores.

An apparatus illustrating certain features of the invention may include a frame, a stationary holder on the frame for supporting a washer, and a pusher reciprocable on the frame for supporting one end of the core and pushing the core a predetermined distance into the washer. The other end of the core is supported adjacent to and in alignment with the washer by an aligning member which overlies the washer and is movable laterally from the core in response to movement of the pusher to provide clearance for movement of the washer and the core assembly from the holder by an ejector element movable with the pusher. A guard mounted on the frame is movable from an open position, permitting loading and unloading of a core and a washer, to a closed position to cover the moving parts of the apparatus during the assembly of the washer onto the core, and the guard during its movement to and from its closed and open positions actuates a valve to control the operation of the machine.

Other objects and advantages of the invention will become apparent by reference to the following detailed description and the accompanying drawings illustrating a preferred embodiment thereof, in which Fig. 1 is a vertical longitudinal sectional view through the machine for assembling an insulating washer onto a relay core with parts of the machine in an inoperative position;

Fig. 2 is a perspective view of the relay core and the washer to be assembled thereon;

Fig. 3 is a front view of the machine looking in the direction of the arrow 3 in Fig. 1 with portions of the machine shown in section;

Fig. 4 is an enlarged fragmentary vertical sectional view with parts of the machine in an operative position; and Fig. 5 is a fragmentary plan sectional view of the machine taken along the line 5—5 of Fig. 4.

The present apparatus is designed to assemble a washer 10 of insulating material having a rectangular aperture 11 therein onto a middle leg 13 of a relay core 14. Adjacent one end the core 14 has a head 15 with a pair of legs 17 extending therefrom in one direction in parallel relation to the leg 13 and a pair of lugs 18 extending therefrom in the opposite direction. The core leg 13 is slightly larger than the aperture 11 of the washer so that a force is required to push the core and washer into assembled relation with the washer positioned adjacent the head 15 as shown in dotted lines in Fig. 2.

The apparatus has a frame 25 which comprises a frame plate 26 extending obliquely from a base 27 and having a transversely disposed platform 28 at its upper end and a pair of reinforcing flanges 29. Secured to the frame is a stationary holder 33 for supporting the washer 10 while the core 14 is forced downwardly into assembled relation thereto. The holder 33 includes a plate 34 having a shallow recess or nest 36 for supporting a washer 10 in a predetermined position. Apertures 37 and 38, 38 in the plate 34 provide clearance for downward movement of the legs 13 and 17, respectively, of the core. The plate 34 is secured to the upper ends of a pair of side members 40 and a front member 41, the latter being secured to the side members which are fastened to the frame plate 26.

A pusher head 45 is provided for pushing the core leg 13 into the washer aperture 11 and into assembled relation with the washer and has a nest 46 for supporting one end of the core, the other end of which is supported adjacent to and in alignment with the washer 11 by an aligning member 49. The pusher head 45 is slidably mounted on the frame plate 26 and is secured to a piston rod 51 of a piston 50. This piston is reciprocable within a cylinder 52 of a fluid actuator 53 which is mounted on the platform 28 and serves to reciprocate the pusher head through an inclined path toward and away from the washer holder 33. Opposite ends of the fluid actuator are connected by pipe lines 55 to a source of air pressure for reciprocating the piston and the pusher head under control of a valve 56 secured to the frame plate 37 and connected to the pipe lines. The valve 56 is spring actuated to a normal position for admitting air to the bottom of the fluid actuator, causing it to move the head 45 to a normal retracted position as shown in Fig. 1, and the valve 56 has an element 57 which may be actuated to reverse the fluid connection to the actuator 53 and cause the head 45 to move downwardly and force the core 14 into assembled relation with the washer 11. The nest 46 of the head 45 has a flat surface 60 engageable with one face of the head end portion of the core 14, a recess 63 for receiving and laterally aligning the end portion 64 of the middle leg 13 of the core 14, and the nest has shoulders 65 for engaging the ends of the lugs 18 to impart movement to the core.

The core aligning member 49 has recesses 66 forming a nest for receiving the legs 13 and 17 of the core and supporting it for longitudinal movement with the end of the leg 13 aligned with the washer aperture 11 of a washer in the holder 33. The aligning member 49 has a normal operative position (Fig. 1) overlying a portion of the washer 10 and is adapted to be moved transversely of the movement of the pusher head 45 to a retracted or inoperative position (Figs. 4 and 5) removed from the washer to provide clearance for movement of the head 15 of the core 14 and of the pusher head 45, and to permit the washer 10 when assembled on the core 14 to be removed from the holder 33. The aligning member 49 is mounted for sliding movement on the plate 34 and between guide members 66' thereon and has a pair of rods 68 extending therefrom through apertures in the frame plate 26. Springs 70 on the rods 68 interposed between the plate 26 and the heads 71 of the rods stress the aligning member 49 for movement from its operative position to its inoperative position, and a cam 74, which is secured to the pusher head 45 for movement therewith, moves the aligning member to its operative position and controls its movement therefrom. The cam 74, which is disposed in a slot 75 in the aligning member 49 and is slidable in a guideway between the members 40 of the holder 33, has a sloping cam surface 76 for effecting reciprocable movement of the aligning member and has surfaces 77 and 78 for holding the aligning member in its operative and inoperative positions, respectively.

An adjustable screw 78 mounted on a plate 79 secured to the holder 33 stops the cam 74 and the pusher head 45 and controls the extent of movement of the core leg 13 into the washer 10 to obtain the positioning of the washer in a predetermined location on the core head 15. Thus, for coils of different sizes the screw 78 would be adjusted to stop the pusher head in different positions. A laterally disposed ejecting arm 82 on the cam 74 engages the lower end of the core leg 13 during the return stroke of the pusher head 45 and raises the core and washer assembly to an upper position where it may be removed from the machine.

Means are provided for guarding the movable portions of the machine during the assembling of the relay parts and to actuate the valve 56 to effect the operation of the machine. A guard 80 in the form of a curved plate extending across the front portion of the machine has a pair of side walls 81 which are positioned on opposite sides of the machine and are pivotally supported by a pin 82' extending through the flanges 38 of the frame. A cross bar 83 extending between the ends of the side walls 81 has a screw 84 adjustably mounted thereon which is engageable with the element 57 of the valve 56 for actuating the valve to effect the downward movement of the pusher head 45 in response to downward movement of the guard 80 to a closed position as shown in dotted lines in Fig. 1. The guard 80 is yieldably maintained in its open or upper position as shown in full lines in Fig. 1 by a coil spring 86, the ends 87 of which engage the frame plate 26 and the cross bar 83, and the guard 80 has a handle 90 by means of which the guard may be moved to and from its open and its closed positions. The screw 84 on the guard does not engage the valve element 57 to actuate the valve 56 until the guard 80 has traversed a greater portion of its downward movement and has approached its lower position so that the guard is effective to prevent accidental insertion of the operator's hand into the machine during its operation.

In the assembling operation a washer 10 is inserted into the nest 36 of the washer holder 33 and a core 14 is placed in the nests 46 and 66 of the pusher head 45 and the aligning member 49, respectively, with the core resting on the washer, as shown in Figs. 1 and 3, after which the operator depresses the guard 80 from its normal open position to its lower closed position to effect the actuation of the valve 56 and the downward movement of the head 45 to force the core leg 13 of a core 14 a predetermined distance into the washer 10, which is thus locked in assembled relation on the core. The operator then moves the guard 80 to its upper position to release the valve 56 and effect the return of the pusher head to its upper position and the movement of the core 14 with the washer assembly thereon to an upper position from which the core and washer assembly may be removed.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for assembling a washer onto a relay core, a frame, a stationary holder on said frame for supporting the washer in a predetermined position, a pusher reciprocable on said frame along a predetermined path and having a nest for supporting one end of the core in a predetermined position and for imparting movement thereto, an aligning member mounted on said frame adjacent said holder for movement transversely of said predetermined path to and from a normal position in overlapping relation to said washer in said holder and having a nest for supporting the other end of the core adjacent to and in alignment with said washer, an actuator on said frame for reciprocating said pusher to push the core into said washer, an element movable with said pusher for moving the core and washer assembly from the holder on the return stroke of the pusher, and means operable in timed relation to the pusher for moving the aligning member from its normal position to provide clearance for the washer as the core and washer assembly is moved from said holder.

2. In an apparatus for assembling a washer onto a relay core, a frame, a stationary holder on said frame for supporting the washer in a predetermined position, a pusher reciprocable on said frame along a predetermined path and having a nest for supporting one end of the core in a predetermined position and for imparting movement thereto, an aligning member mounted on said frame adjacent said holder for movement transversely of said predetermined path to and from a normal position in overlapping relation to said washer in said holder and having a nest for supporting the other end of the core adjacent to and in alignment with said washer for sliding movement thereinto, an actuator on said frame for reciprocating said pusher to push the core into said washer, an element movable with said pusher for moving the core and washer assembly from the holder on the return stroke of the pusher, means operable in timed relation to the pusher for moving the aligning member from its normal position to provide clearance for the washer as the core and washer assembly is moved from said holder, a guard mounted on said frame for movement from an open position permitting loading and unloading of the washer and core being assembled to a closed position for shielding portions of the apparatus and the washer and the core being assembled, a handle on said card for actuating it to and from open and closed positions, and control means operable in response to the movement of said guard to and from said closed position for effecting the operation of said actuator.

3. In an apparatus for assembling a washer onto a relay core, a frame, a stationary holder on said frame for supporting the washer in a predetermined position, a pusher reciprocable on said frame along a predetermined path and having a nest for supporting one end of the core and for imparting movement thereto, an aligning member mounted on said frame adjacent said holder and said washer therein for movement transversely of said predetermined path to an operative position in overlapping relation to said washer and to an inoperative position removed from said washer, said aligning member having a nest for supporting the other end of the core adjacent to and in alignment with said washer and for sliding movement thereinto when said aligning member is in its operative position, an actuator mounted on said frame for reciprocating said pusher to push the core into said washer, an ejector movable with the pusher for moving the core and washer assembly from said holder, and means including a cam movable with said pusher for moving the aligning member to and from its operative and inoperative positions to provide clearance for the washer as the core and washer assembly is moved from the holder.

4. In an apparatus for assembling a washer onto a relay core, a frame, a stationary holder on said frame for supporting the washer in a predetermined position, a pusher reciprocable on said frame along a predetermined path and having a nest for supporting one end of the core and for imparting movement thereto, an aligning member mounted on said frame adjacent said holder and said washer therein for movement transversely of said predetermined path to an operative position in overlying relation to said washer and to an inoperative position removed from said washer, said aligning member having a nest for supporting the other end of the core adjacent to and in alignment with said washer when said aligning member is in its operative position, an actuator on said frame for reciprocating said pusher to push the core into said washer, an ejector movable with said pusher for moving the core and washer assembly from the holder, resilient means for stressing said aligning member for movement from its operative position, and cam means movable with said pusher for moving said aligning member to its operative position and for effecting the movement thereof from its operative position during alternate movements of said pusher to provide clearance for the washer as the core and washer assembly is moved from the holder.

5. In an apparatus for assembling a washer onto a relay core having a head adjacent one end thereof, a frame, a stationary holder on said frame for supporting the washer in a predetermined position, a pusher reciprocable on said frame along a predetermined path and having a nest for supporting one end of the core and for imparting movement thereto, an aligning member mounted on said frame adjacent said holder and said washer therein for movement transversely of said predetermined path to an operative position in overlapping relation to said washer and to an inoperative position removed from said washer, said aligning member having a nest for supporting the other end of the core adjacent to and in alignment with said washer for sliding movement thereinto when said aligning member is in its operative position, an actuator on said frame for reciprocating said pusher to push the core into said washer, adjustable means for stopping the movement of said pusher in a predetermined position to control the extent of movement of the core into the washer to effect the accurate positioning of the washer adjacent to the core head, an element movable with said pusher for moving the core and washer assembly from the holder, resilient means for stressing said aligning member for movement from its operative position, and cam means movable with said pusher for moving said aligning member to its operative position and for effecting the movement thereof from its operative position during a predetermined portion of the movements of said pusher toward and from said holder to provide clearance for the washer as the core and washer assembly is moved from the holder.

6. In an apparatus for assembling a washer onto a relay core, a frame, a stationary holder on said frame for supporting the washer in a predetermined position, a pusher reciprocable on said frame along a predetermined path and having a nest for supporting one end of the core and for imparting movement thereto, an aligning member mounted on said frame adjacent said holder and said washer therein for movement transversely of said predetermined path to an operative position in overlapping relation to said washer and to an inoperative position removed from said washer, said aligning member having a nest for supporting the other end of the core adjacent to and in alignment with said washer for sliding movement thereinto when said aligning member is in its operative position, a fluid actuator mounted on said frame for reciprocating said pusher to push the core into said washer, an ejector element movable with the pusher for moving the core and washer assembly from said holder, and means operable in response to movement of said pusher for moving the aligning member to and from its operative and inoperative positions to provide clearance for the washer as the core and washer assembly is moved from the holder, a guard pivotally mounted on said frame for movement from a normal open position for permitting the loading and unloading of the washer and core being assembled to a closed position for shielding portions of the apparatus and the washer and core being assembled, a valve for controlling the operation of said fluid actuator, and means on said guard for actuating said valve in response to movement of the guard to and from its closed position.

References Cited in the file of this patent

UNITED STATES PATENTS

| | | |
|---|---|---|
| 1,503,829 | Heald | Aug. 5, 1924 |
| 2,234,098 | Wells | Mar. 4, 1941 |
| 2,275,561 | Sahlin | Mar. 10, 1942 |
| 2,708,305 | Ohl | May 17, 1955 |